United States Patent [19]

Müller

[11] 4,430,603
[45] Feb. 7, 1984

[54] BRUSHLESS DIRECT CURRENT MOTOR HAVING A ONCE-AROUND PULSE GENERATING MEANS

[76] Inventor: Rolf Müller, Ackerstr. 13, DT-7742 St. Georgen, Fed. Rep. of Germany

[21] Appl. No.: 284,385

[22] Filed: Jul. 17, 1981

[30] Foreign Application Priority Data

Jul. 18, 1980 [CH] Switzerland ............... 5498/80

[51] Int. Cl.³ ............................................. G05B 19/40
[52] U.S. Cl. ................................. 318/254; 318/138; 318/439
[58] Field of Search .......... 318/138, 254, 439, 254 A; 307/106; 324/174

[56] References Cited

U.S. PATENT DOCUMENTS

| | | | |
|---|---|---|---|
| 3,848,167 | 11/1974 | Ratschmeier | 318/254 A |
| 3,903,463 | 9/1975 | Kanamori | 318/254 |
| 3,916,272 | 10/1975 | Grünleiter et al. | 318/254 A |
| 4,070,606 | 1/1978 | Morozumi et al. | 318/254 A |
| 4,164,691 | 8/1979 | Wada | 318/254 A |
| 4,238,692 | 12/1980 | An et al. | 307/106 |
| 4,266,192 | 5/1981 | Ohtani | 324/174 |
| 4,365,187 | 12/1982 | McDaniel et al. | 318/138 |

FOREIGN PATENT DOCUMENTS 2217884 9/1978 Fed. Rep. of Germany ... 318/254 A

Primary Examiner—F. W. Isen
Attorney, Agent, or Firm—Fitch, Even, Tabin & Flannery

[57] ABSTRACT

A brushless direct current outer rotor motor with a substantially cylindrical air gap (14), particularly for driving magnetic disks. The rotor (16) of the motor (10) supports a permanently-magnetized exciter magnet (13, 13″) having at least two pairs of poles and a permanently-magnetized control magnet (18, 18′, 18″). At least one detector (20, 34, 26) of rotary position cooperates with its control magnet, and is responsive to the magnetic field to sense the position of the rotor. There is also provided commutating means (32) responsive to the detector of the rotary position, and a stator winding means (12) connected to the commutating means. A control pulse generator stage (21,29; 35,36; 47,55) adapted to generate one pulse only per each revolution of the rotor (16) is coordinated with the control magnet (18, 18′, 18″).

10 Claims, 30 Drawing Figures

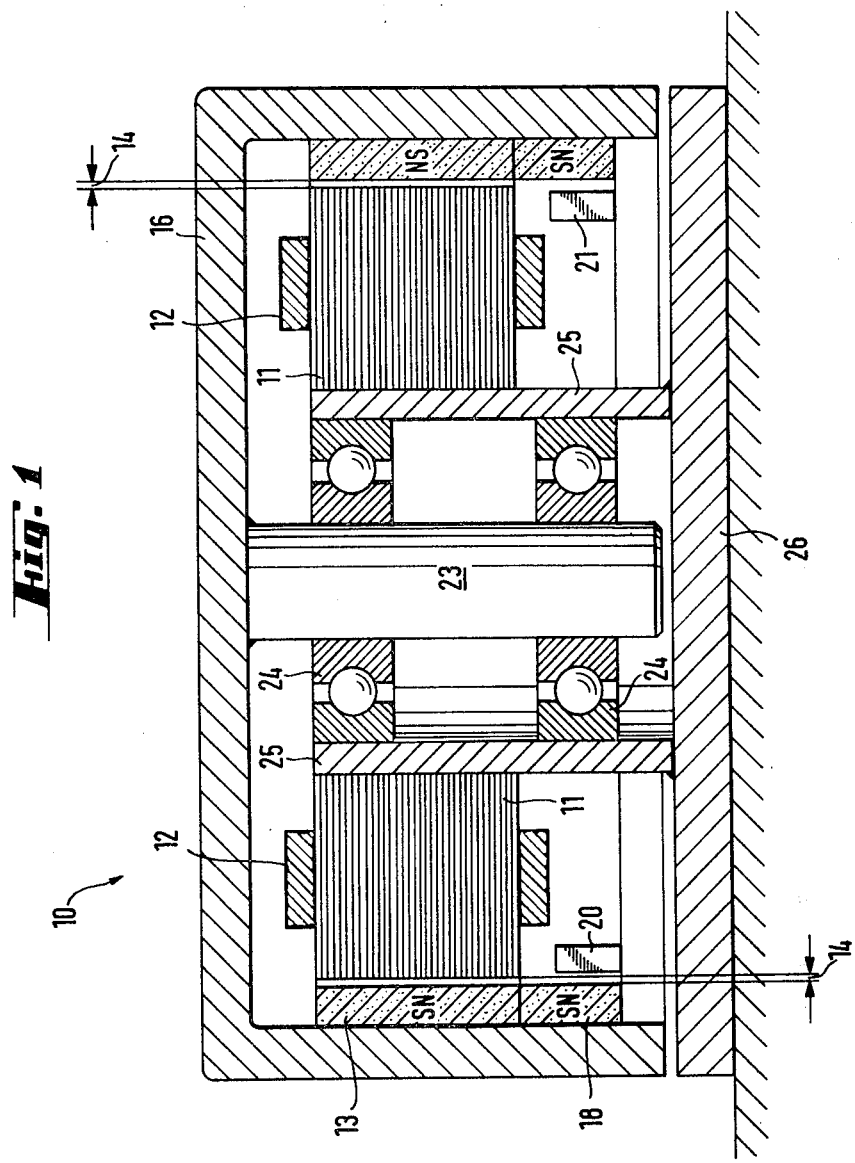

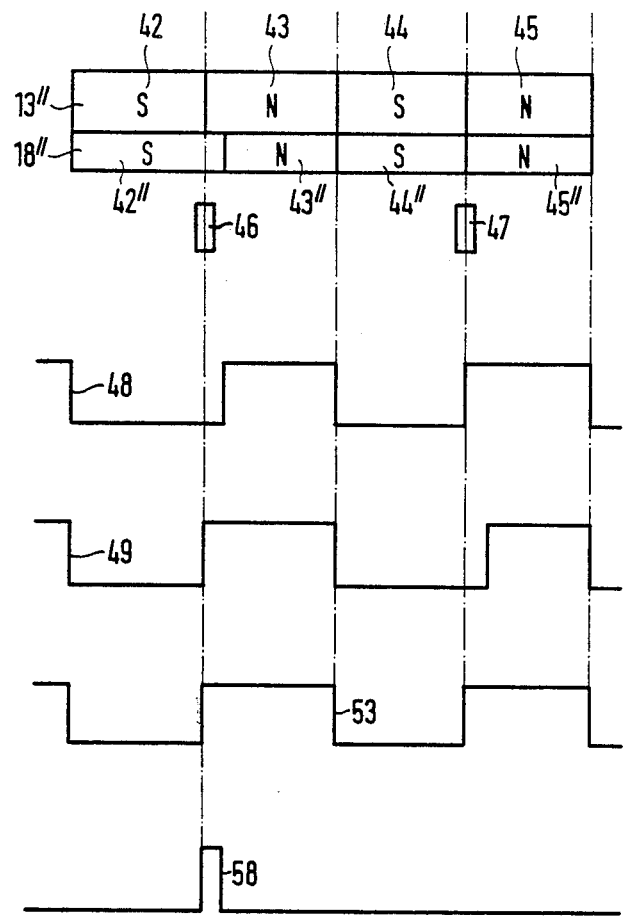
Fig. 5a
Fig. 5b
Fig. 5c
Fig. 5d
Fig. 5e
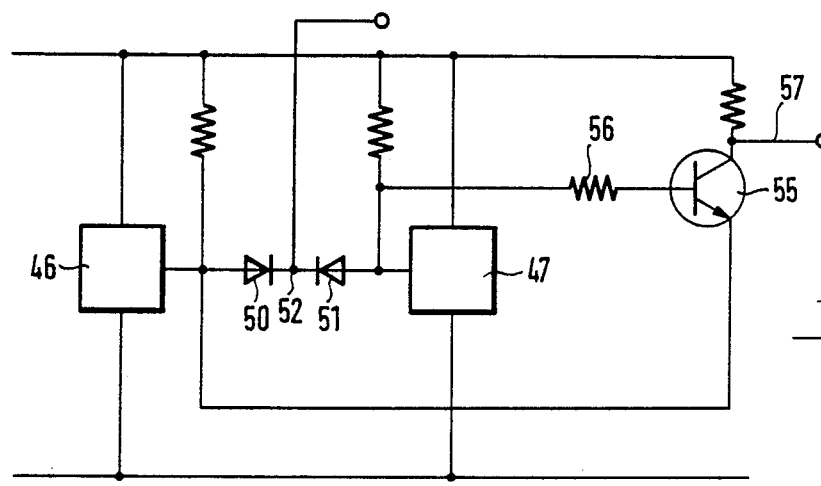
Fig. 6

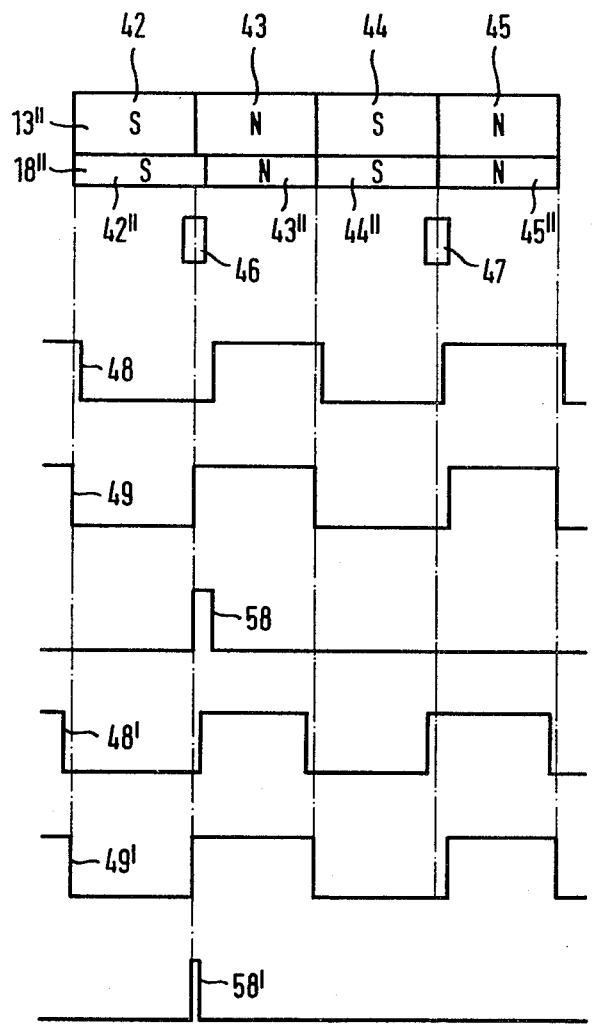

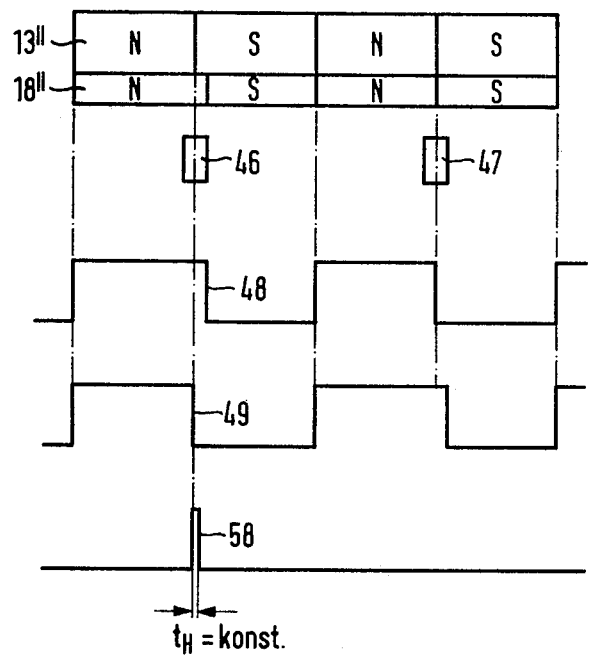

BRUSHLESS DIRECT CURRENT MOTOR HAVING A ONCE-AROUND PULSE GENERATING MEANS

The invention relates to a brushless direct current outer rotor motor with a substantially cylindrical air gap, particularly for driving magnetic disks, comprising a rotor having a permanently magnetized exciter magnet comprising at least two pairs of poles and a permanently magnetized control magnet, at least one detector of rotary position cooperating with the control magnet and being responsive to its magnetic field to detect the rotary position, a commutating means controlled in response to the detector of the rotary position, and a stator winding means connected to the commutating means.

Motors of such kind have been already known (U.S. Pat. No. 4,030,005, and U.S. Pat. No. 4,099,104). In connection with the use of these motors in practice, particularly for driving magnetic disks, but also in other cases, as for example in position driving systems of any kind, the question often arises in regard to the control or tachometer signal which appears once only per each revolution of the rotor and which can be used as a reference signal for the angular position of the rotor, e.g. in the case of magnetic disks as the start marking for the beginning of the track.

Such a control system is easily obtained in motors with two-pole exciter magnets. For example, only the leading edge of the magnetization curve is to be involved. But this simple system of generating the control signal is not obtained in motors where the exciter magnet has two or more poles, because two or more pair of leading edges appear in the flux curve per each full revolution of the motor and the result is the absence of coordination between such a an edge and the position of the rotor.

This disadvantage is overcome by the invention by associating with the control magnet a control pulse generating stage which generates only one pulse per revolution of the rotor.

In a further development of the invention the control magnet can be so radially unsymmetrically magnetized in the circumferential direction that it has only one pole in said direction of magnetization. The pole width of the said one control magnet pole coincides with the pole width of the exciter magnet. Diametrically opposite to the detector of the rotary position is another detector of rotary position, and a circuit stage adding up the output signals of both detectors of rotary position is connected in series with the commutating means. In this embodiment of the invention, the control signal unambiguously indicating the position of the rotor can be selectively generated by the one or the other detector of the rotary position, for example in the form of the rising edge in the flux curve of the control magnet via a edge-controlled one-shot multivibrator. But the commutation signal is obtained by the addition of the output signals of the detectors of the rotary position.

According to a modified variation of the invention, the exciter magnet and the control magnet have each the same number of pairs of poles, with the same pole width. There is a discontinuity in the flux curve of the control magnet. In addition to the detector of the rotary position, there is provided another detector of rotary position responsive only to the flux discontinuity. The one detector of rotary position provides the commutation signal, while the other detector of rotary position provides the control signal which occurs only once per each revolution of the rotor.

A small auxiliary magnet can be simply associated in this embodiment with the control magnet in order to provide the flux discontinuity, said auxiliary magnet being located at a predetermined place in circumferential direction. In order to evaluate the flux curve, said one detector of rotary position is preferably a sensor responsive to the magnetic field and having a symmetrical Schmitt-trigger, and the other detector of rotary position is a sensor responsive to the magnetic flux and having an unsymmetrical Schmitt-trigger, i.e. one responsive only to the signals of the one polarity. The symmetrical Schmitt-trigger provides the commutation signal, while the unsymmetrical Schmitt-trigger delivers the control signal.

According to another advantageous embodiment of the invention, the exciter magnet and the control magnet are identically magnetized. One of the pole pairs of the magnets is so unsymmetrically formed that the pole of one direction of magnetization is somewhat shorter than the pole of the other direction of magnetization, while a further pair or pairs of poles are symmetrical. Diametrically opposite to the detector of rotary position is another detector of rotary position. An one-sidedly operative exclusive OR-circuit is provided with two inputs, which receive the output signals of both detectors of rotary position. The slight asymmetry of the one pair of poles virtually does not affect the functional characteristics of the motor. For example, the more positive of both output signals of the detectors of rotary position is used as a commutation signal, while the one-sidedly operative OR-circuit delivers a control pulse per each revolution of the rotor.

The invention will be now described on the basis of embodiments illustrated by the accompanying drawings, wherein:

FIG. 1 is a schematic cross-section of a brushless direct current outer rotor motor of the invention, FIGS. 2a and 2b show the flux curves for the exciter magnet and the control magnet of the motor of FIG. 1, FIGS. 2c, 2d and 2e shows various signals occurring in the motor of FIG. 1, FIG. 3 is a simplified diagrammatic circuit plan of the motor of FIG. 1.

FIG. 4a shows a developed view of the field magnet and control magnet for a modified embodiment of the motor, FIG. 4b is the flux curve of the control magnet of FIG. 4a, FIGS. 4c and 4d show the commutation signal and the control signal of the modified embodiment of FIG. 4a, FIG. 5a is a developed view of the field magnet and the control magnet for another modified embodiment of the invention, FIGS. 5b to 5e shows various signals for the motor according to FIG. 5a, and FIG. 6 is a circuit diagram of the detectors of rotary position and the one-sidedly operative exclusive OR-circuit provided in conjunction with the embodiment of FIG. 5a.

FIG. 8a to FIG. 8g is a developed view of the field and control magnet according to FIG. 5a and different signals for the embodiment according to FIG. 7.

FIG. 9 is a diagram of the circuitry of the detectors of rotary position and of the computing circuit in the form of a one-shot multivibrator with reset input, provided in conjunction with the embodiment of the magnets according to FIG. 5a.

FIGS. 10a to 10d are a developed view of the field and control magnet according to FIG. 5a and different signals for the embodiment according to FIG. 9.

Figure 2A:
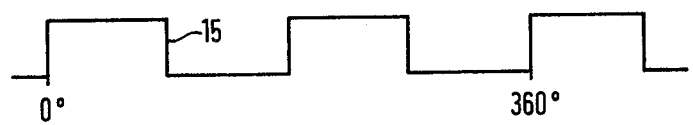
Figure 2B:
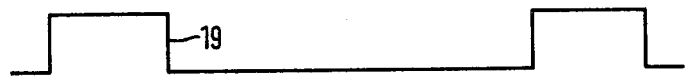

The brushless direct current outer rotor motor 10 shown in FIG. 1 comprises a stator package 11 of sheet iron, supporting a stator winding arrangement 12, which in this embodiment is a one-wire arrangement. The sheet iron stator package 11, together with an annular, permanently magnetized exciter or field 13, forms a substantially cylindrical air gap 14. It is assumed in this embodiment that the exciter magnet 13 is circumferentially four-pole magnetized. This means that two magnetic north poles and two magnetic south poles are located in alternating sequence on the inner side of the exciter magnet 13 facing the air gap 14, in each case corresponding substantially to a width of 90° (physically). By suitable means, an approximately rectangular or trapezoidal magnetization is obtained in the circumferential direction of the air gap 14, as shown by the magnetization curve 15 in FIG. 2a. The exciter magnet 13 is disposed on an outer rotor bell 16 which forms the magnetic circuit; e.g. it is glued into the bell. An annular, permanently magnetized control magnet 18 is disposed below the exciter magnet 13; said control magnet 18, according to the control flux curve 19 of FIG. 2b has on the side facing the air gap 14 only one north pole of a width corresponding to the width of the north and south poles of the exciter magnet 13. Two detectors 20, 21, e.g. Hall generators or Hall-ICs cooperate with the control magnet 18; said detectors are diammetrically opposite relative to the axis of the rotor.

Particularly expedient as the exciter and control magnets are rubber magnets or plastic-bound magnets. Exciter and control magnets can be made of two separate magnet rings, but they can be also integral. Instead of magnet rings, also tray-shaped magnetic segments can be glued into the bell 16 or in some way incorporated there. A stub shaft 23 is mounted in the center of the outer rotor bell 16; said shaft is supported in a ball bearing 24 in a sleeve 25, which supports the sheet iron stator package 11 and is mounted on a stator base plate 26.

Figure 2C:
Figure 2D:
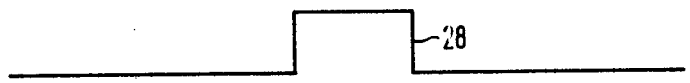
Figure 2E:
Figure 3:
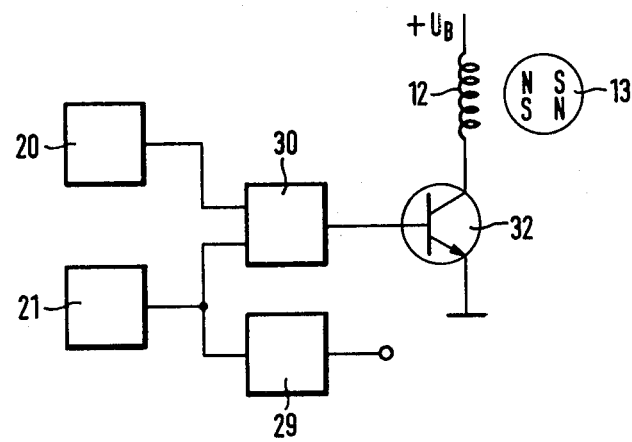

When the outer rotor bell 16 rotates relative to stationary detectors of the rotary position 20, 21, detector 20 emits a signal 27 (FIG. 2c), while detector 21 delivers a signal 28 (FIG. 2d) which is offset by 180° relative to signal 27. Each of the signals 27, 28 can be used as a control signal, which occurs only once per each revolution of the bell 16. If narrower control pulses are expected, it is sufficient to employ, for example, a one-shot multivibrator 29, adapted to be triggered by positive sides or edges, of the output of one of the detectors 20, 21, as shown in FIG. 3. Signals 27, 28 are then combined in an addition stage 30 to provide the commutation signal 31 of FIG. 2e, and the commutating means, diagrammatically shown in FIG. 3 as 32, is therewith caused to be operated.

Figure 4A:
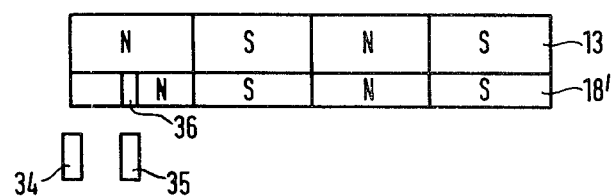
Figure 4B:
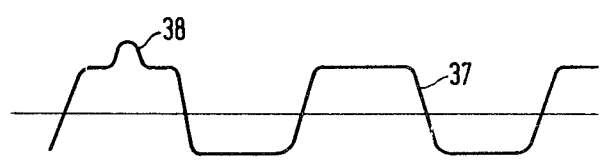
Figure 4C:
Figure 4D:

FIG. 4a diagrammatically shows a developed view of the exciter magnet 13 and of control magnet 18' together with two detectors of rotary position 34, 35, adapted to switch in response to the magnetic field and spaced apart at any distance in circumferential direction. The exciter magnet 13 and the control magnet 18' in this embodiment have the same number of pairs of poles. But an auxiliary magnet 36, likewise diagrammatically shown in FIG. 4a, is associated with the control magnet 18' in the area of one pole. As a result, a control flux curve 37 of the kind illustrated in FIG. 4b is formed under the influence of the auxiliary magnet 36; the curve has a discontinuity in the form of a hump 38. Detector 34 is equipped with a symmetrical Schmitt-trigger, i.e. a Schmitt-trigger responsive to signals of both polarities, insofar as these signals exceed a predetermined minimum level. This minimum level is so adjusted that it corresponds at most to the normal amplitude of the control flux curve 37. But detector 35 has an asymmetrical Schmitt-trigger responsive only to signals according to the positive part of the control flux curve 37. The threshold magnitude thereof is so adjusted that the trigger delivers a signal only when the auxiliary magnet 36 runs past on the detector 35. Under these conditions, at the output of the detector 34 appears the commutation signal 39 of FIG. 4c, while detector 35 emits the control signal 40 (FIG. 4d) in the form of a pulse, which occurs only once per each complete revolution of the outer rotor bell 16.

FIG. 5a shows a developed view similar to FIG. 4a. The exciter magnet 13'' and the control magnet 18'' are identically magnetized. The first pole pair of the control magnet 18'' in FIG. 5a is so unsymmetrically formed that the north pole 43'' facing the air gap is somewhat shorter than the south pole 42''. But the poles 44'', 45'' of the second pole pair are symmetrical. The control magnet 18'' has again two detectors of rotary position 46, 47 associated therewith, which are offset relative to each other by 180°, e.g. Hall-ICs. Pulse sequences 48, 49, according to FIG. 5b or 5c, appear at the outputs of detectors 46, 47 on rotation of the outer rotor bell 16.

As shown in FIG. 6, the outputs of the detectors of rotary position 46, 47 are each connected via a diode 50, 51 to the one common point 52. This means that a signal 53 (FIG. 5d) appears at the common point, and said signal corresponds to the one more positive of both signals 48, 49 and represents a symmetrical commutation signal. The base of a transistor 55 via a series resistor 56 is connected to the output of the detector 47, while the emitter of the transistor 55 is connected to the output of detector 46. The so connected transistor 55 functions as one-sided exclusive OR-circuit, which at its output 57 delivers a pulse 58 (FIG. 5e) only when signal 49 is more positive than signal 48. This condition is met only once during each complete revolution of the outer rotor bell 16 for a time period corresponding to the shortening of the pole 43''.

Figure 7:
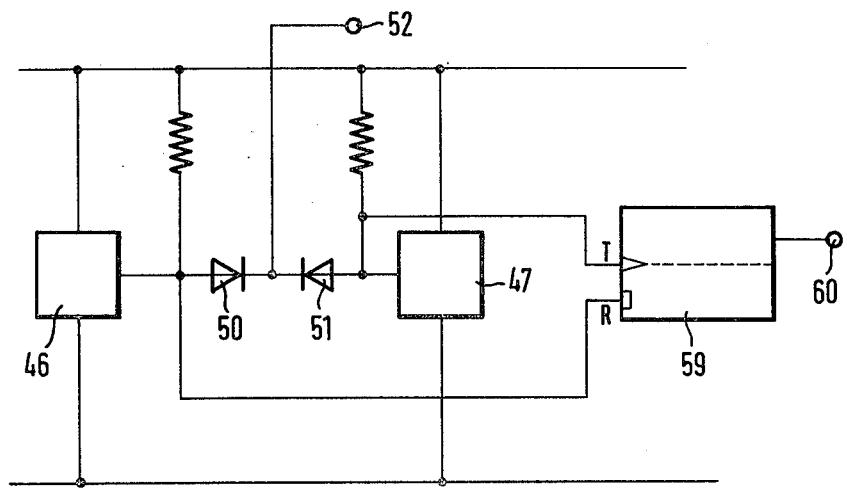
FIG. 7 is a circuit diagram of the detectors of rotary position and of a computing circuit in the form of a dynamically triggered flip-flop, which are provided in conjunction with the embodiment of the magnets according to FIG. 5c.

FIG. 7 shows circuitry similar to that of FIG. 6, but with a dynamically triggered flip-flop 59 instead of the exclusive OR-circuit with transistor 55. The toggle input T of the flip-flop 59 is controlled by the output signal of the detector 47 of rotary position, while the reset input R of the flip-flop 59 is controlled by the output signal of the detector 46 of rotary position.

This circuit provides the advantage that mutually overlapping signal sides or edges of both detectors 46, 47 of rotary position and also mutually offset in time output signals of the detectors of rotary position, caused by the detectors of rotary position 46 and 47 being not exactly diametrically opposite, for example due to unavoidable construction tolerances, do not lead to any error signals in the evaluation, for example to the occurrence of two pulses per revolution instead of the intended one pulse per revolution.

This kind of occurrence is seen in FIGS. 8a to 8g, of which FIGS. 8a, 8b, 8c and 8d correspond to FIGS. 5a, 5b, 5c or 5e and reflect the situation where the detector 47 of rotary position is exactly diagonally opposite the detector 46 of rotary position. But FIGS. 8e and 8f show signals 48', 49' of the detectors 46 or 47 of rotary position on a deflection of the detectors 46, 47 of rotary position from the correct diametric position. As follows from FIG. 8g, also in such an occurrence only a single output pulse 58' is delivered at the output 60 of the flip-flop 59 per each revolution of the motor.

Figure 9:
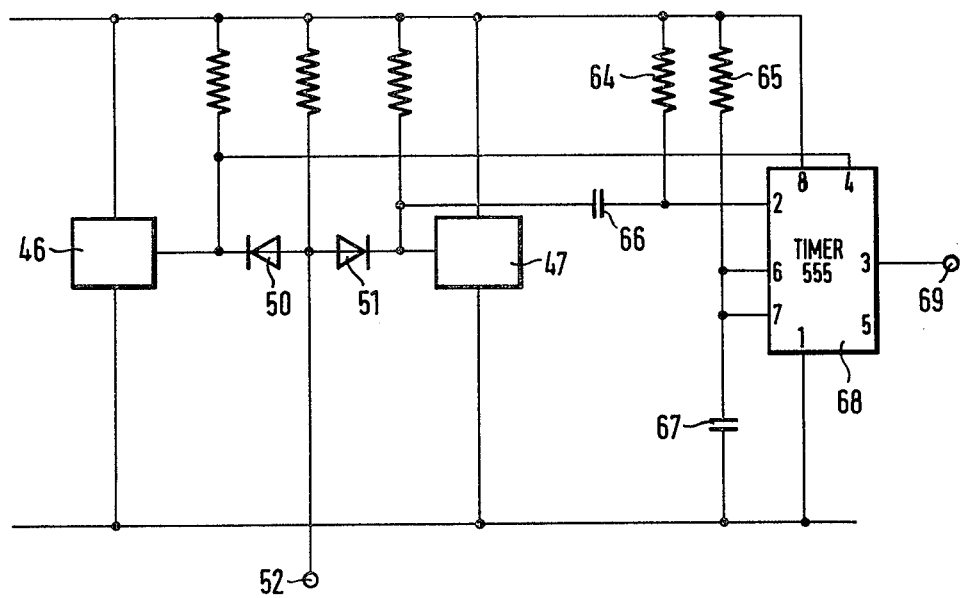

FIG. 9 shows another modified plan of circuitry similar to that of FIGS. 6 and 7. As the evaluation (computing) circuit, there is provided a timer 68 of the 555 type, which, in conjunction with resistances 64, 65 and condensers 66, 67 constitutes a one-shot multivibrator with reset input. Resistance 64 and condenser 66 form a differentiating circuit for dynamically triggering the set input 2 of the timer 68 with the output signal of the detector 47 of the rotary position. The output signal of the detector 46 of rotary position applies to the reset input 4 of the timer 68. The function of this embodiment is very equivalent to the flip-flop evaluation according to FIG. 7. Also in this case there is provided precaution against error signals when the detectors 46, 47 of rotary position are not exactly opposite each other. The difference consists in that the pulse width $t_H$ of the control signal 58 occurring at the output 69 of the timer 68 remains always constant under the influence of the RC-circuit formed by resistance 65 and condenser 67. This is indicated in FIG. 10; FIGS. 10a, 10b, 10c and 10d corresponding to FIGS. 5a, 5b, 5c and 5e.

The above described embodiments related to a one-wire motor with two pairs of poles. But the described principle is also readily applicable to other numbers of wire and/or motors with two or more pairs of poles. It is also applicable to motors with cylindrical airgap and an inner rotor and to a motor with an axial airgap and disc-shaped rotor, where the soft-magnetic backing part disposed in the airgap and the permanent magnet of the rotor can be associated with the rotor or the stator.

I claim:

1. In a brushless direct current motor including a rotor, a stator, said rotor supporting a permanently magnetized exciter magnet having at least two pairs of poles and a permanently magnetized control magnet, the poles being alternately magnetized in a circumferential direction, said stator supporting a winding means, and commutating means for controlling the current to the winding means, means for supplying a commutation signal to said commutating means and providing a once-around rotor position control signal, said means comprising two rotary position detectors circumferentially spaced the path of movement of the control magnet and each being responsive to the magnetic field of the control magnet to provide an output signal, first circuit means responsive to said output signals to generate a commutation signal having one pulse for each pair of poles for each revolution of the rotor, and second circuit means responsive to at least one of said output signals to generate only one control signal for each revolution of the rotor.

2. A brushless direct current motor in accordance with claim 1, wherein the exciter magnet and control magnet are carried by the rotor and the winding means and the rotary position detectors are supported by the stator.

3. A brushless direct current motor according to claim 1, wherein the control magnet includes one pole, the pole width of which corresponds with the pole width of the pole of the exciter magnet, the position detectors are disposed diametrically opposite each other, the first circuit means adds the output signals of the detectors to provide the commutation signal, and the second circuit means is connected to one of the output signals to provide the control signal.

4. A brushless direct current motor according to claim 1, wherein the control magnet includes the same number of pairs of poles and of the same pole width as those in the exciter magnet, one of the poles in the control magnet has a discontinuity in its flux curve, the output of one of said detectors being coupled to said second circuit, said second circuit including means for preventing an output except when said one detector responds to said flux discontinuity, and the output of the other of said detectors being connected to said first circuit means, said first circuit means having means for permitting an output when said other detector responds to only both directions of magnetization.

5. A brushless direct current motor according to claim 4, wherein the field discontinuity is provided by an additional magnet.

6. A brushless direct current motor according to claim 5, wherein said first circuit includes a symmetrical Schmitt-trigger circuit and said second circuit includes an unsymmetrical Schmitt-trigger circuit.

7. A brushless direct current motor according to claim 1, wherein the exciter magnet and the control magnet are identically magnetized except that one pole of one pair of poles of the control magnet is shorter in a circumferential direction than the other pole, the detectors are disposed in diametrically opposite positions, and the second circuit means includes an evaluation circuit which is responsive to the output signals of both detectors which evaluation circuit generates the control signal when both detectors are adjacent poles having different directions of magnetization.

8. A brushless direct current motor in accordance with claim 7, wherein the evaluation circuit is a one-sided operative exclusive OR circuit having two inputs which have coupled thereto the output signals of both detectors.

9. A brushless direct current motor according to claim 7, wherein the evaluation circuit is a flip-flop having a toggle input connected to one of the output signals of said detectors and having its reset input connected to the other of said outputs.

10. A brushless direct current motor according to claim 7, wherein the evaluation circuit is a one-shot multivibrator having its reset input connected so as to be responsive to the output signal of one of said detectors and having its set input connected so that it is responsive to the output signal of the other of said detectors.

* * * * *

UNITED STATES PATENT AND TRADEMARK OFFICE
CERTIFICATE OF CORRECTION

PATENT NO. : 4,430,603

DATED : February 7, 1984

INVENTOR(S) : Rolf Müller

It is certified that error appears in the above-identified patent and that said Letters Patent is hereby corrected as shown below:

Column 2, line 46, after "1" delete the period (.) and insert --a comma (,)--;

Column 3, line 17, after "field" insert --magnet--;

Column 3, lines 57-58, "expected" should read --desired--;

Column 5, line 59, after "spaced" insert --along--;

Column 6, line 29, after "to" delete --only--;

Signed and Sealed this

Eighteenth Day of September 1984

[SEAL]

Attest:

GERALD J. MOSSINGHOFF

Attesting Officer

Commissioner of Patents and Trademarks